(12) United States Patent
Werquin et al.

(10) Patent No.: US 9,458,795 B2
(45) Date of Patent: Oct. 4, 2016

(54) ACTUATION DEVICE FOR MOVING A MOVABLE COVER OF A THRUST REVERSER

(71) Applicant: Sagem Defense Securite, Boulogne-Billancourt (FR)

(72) Inventors: Mickael Werquin, Boulogne-Billancourt (FR); Denis Dauvergne, Boulogne-Billancourt (FR); Oleg Gomolko, Boulogne-Billancourt (FR)

(73) Assignee: SAGEM DEFENSE SECURITE, Boulogne-Billancourt (FR)

(*) Notice: Subject to any disclaimer, the term of this patent is extended or adjusted under 35 U.S.C. 154(b) by 0 days.

(21) Appl. No.: 14/778,972

(22) PCT Filed: Mar. 21, 2014

(86) PCT No.: PCT/EP2014/055756
§ 371 (c)(1),
(2) Date: Sep. 21, 2015

(87) PCT Pub. No.: WO2014/147247
PCT Pub. Date: Sep. 25, 2014

(65) Prior Publication Data
US 2016/0061146 A1    Mar. 3, 2016

(30) Foreign Application Priority Data

Mar. 22, 2013  (FR) ...................................... 13 52558

(51) Int. Cl.
*F02K 1/76*    (2006.01)

(52) U.S. Cl.
CPC .................................... *F02K 1/766* (2013.01)

(58) Field of Classification Search
CPC ........... F02K 1/76; F02K 1/763; F02K 1/766
USPC ..................... 74/89.39; 60/226.2; 244/110 B
See application file for complete search history.

(56) References Cited

U.S. PATENT DOCUMENTS

| | | | | |
|---|---|---|---|---|
| 6,487,846 B1* | 12/2002 | Chakkera | ................ | F02K 1/766 239/265.27 |
| 2011/0072780 A1* | 3/2011 | Somerfield | ............. | F02K 1/763 60/226.2 |
| 2013/0264399 A1* | 10/2013 | Wingett | ................. | F02K 1/625 239/265.19 |

FOREIGN PATENT DOCUMENTS

| | | |
|---|---|---|
| EP | 0 102 684 A1 | 3/1984 |
| EP | 2 471 709 A1 | 7/2012 |

*Primary Examiner* — William C Joyce
(74) *Attorney, Agent, or Firm* — Blakely Sokoloff Taylor & Zafman LLP (57) ABSTRACT

The invention relates to an actuation device (1) for moving a movable cover of a thrust reverser. Said actuation device includes: —an actuator including a first element (4), such as a screw, and a second element (5), such as a nut, that engages with the first element such that rotation of the first element causes translation of the second element; —a locking portion (31) rotatable between a locked position, wherein the locking portion prevents the first element (4) from rotating, and an unlocked position, wherein the locking portion (31) allows the first element (4) to rotate; and —an inhibiting part (45) that is translatable between a first position, wherein the inhibiting part (45) allows the locking portion (31) to rotate, and a second position, wherein the inhibiting part (45) prevents the locking portion (31) from rotating into the locked position.

19 Claims, 9 Drawing Sheets

FIG. 3
locked position

FIG. 4
locked position

FIG. 5
locked position

FIG. 6
unlocked position

FIG. 7
unlocked position

FIG. 8
unlocked position

FIG. 9
locking

FIG. 10
locking

FIG. 11
manual unlocking

FIG. 12
manual unlocking

ACTUATION DEVICE FOR MOVING A MOVABLE COVER OF A THRUST REVERSER

FIELD OF THE INVENTION

The invention relates to an actuation device for displacing a movable cover of a thrust reverser.

PRIOR ART

The power plant system or PPS of an airplane generally includes a nacelle and a turbojet fixed to a pylon of a wing or of a fuselage of the airplane. In the case of a turbofan with a high bypass ratio, the turbofan includes a gas generator (high pressure assembly or CoHP), a low pressure assembly (or CoBP), a fan and nozzles. The fan makes it possible to accelerate a secondary air flow circulating in the air stream of the fan to generate the thrust needed for propulsion of the airplane.

The power plant system of airplanes generally include a thrust reverser system or TR making it possible to reverse thrust during landing so as to improve the braking capacity of the airplane. Such a system includes a set of movable covers, driven by a set of associated actuators, making it possible to temporarily obstruct the air stream and to divert the secondary air flow to the outside and toward the front of the nacelle, generating as a result a counterthrust which supplements the braking of the wheels.

In the case of a "door type" thrust reverser system, the nacelle is equipped with movable covers (called "doors") which pivot with respect to the structure of the nacelle between a retracted position wherein the covers allow circulation of an air flow in the stream to the outside and toward the rear of the nacelle, and a deployed position wherein the covers obstruct the stream and reorient the flow of air to the outside and toward the front of the nacelle.

In the case of a "cascade type" thrust reverser system, the nacelle is equipped with movable covers which slide with respect to the structure of the nacelle, along rails, between a retracted position wherein the covers allow circulation of the secondary flow in the air stream to the outside and toward the rear of the nacelle and a deployed position wherein the covers uncover cascades of diverting vanes positioned within the thickness of the nacelle and obstruct the air stream through flaps, the actuation whereof is linked to the movement of the covers.

Generally, in one case or the other, the movable covers are actuated by a set of dedicated actuators. Mechanical synchronization of the movement of the actuators is provided by a synchronization system including flexible shafts mechanically interconnecting the actuators.

In addition, the thrust reverser systems compulsorily include several locking devices allowing untimely deployment of the covers during flight to be prevented. Among the locking devices equipping thrust reverser systems, certain locking devices called "primary" or PLS (primary lock system) act on the flexible shaft to block the flexible shaft in rotation.

Document U.S. Pat. No. 6,786,039 describes an actuation system of a thrust reverser including an actuator driven in motion between a retracted configuration and a deployed configuration by a drive shaft connected to a flexible shaft. The system includes a locking device which can be controlled to engage or disengage the drive shaft so as to prevent or allow rotation of the drive shaft. The system further includes a lock inhibitor maintaining the locking device to remain in the disengaged position as long as the actuator is not in the retracted configuration.

The locking device includes a locking rod that is movable in translation, a return spring to drive the rod toward the engaged position and an electromagnet which can be activated to drive the rod toward the disengaged position.

Such a locking device must be designed so as not to unlock in the event of a jolt. In particular, the device must operate regardless of considerable dynamic loads which can occur in the event of loss of a blade in the airplane's engine (fan blade out), three of these jolts being able to generate drastic accelerations. The locking device must also be insensitive to other sources of excitation (imbalance, rolling vibration, etc.) which can cause accelerations reaching 200 G.

That is why, in locking devices, it is generally necessary to provide a return spring having considerable stiffness so as to ensure that the locking rod is not disengaged in the event of a jolt. This has the result that it is generally necessary to provide an electromagnet capable of generating a large unlocking force so as to overcome the force exerted by the return spring and disengage the locking rod.

It follows that the locking device necessarily has considerable bulk due to the considerable dimensions of the spring and of the electromagnet which are provided to prevent untimely unlocking.

SUMMARY OF THE INVENTION

One aim of the invention is to propose an actuation device which has reduced bulk.

This aim is attained within the scope of the present invention thanks to an actuation device for displacing a movable cover of a thrust reverser, including:
  an actuator including a first element, and a second element movably mounted in translation with respect to the first element, one of the first element and the second element being a screw, and the other being a nut capable of cooperating with the screw so that a rotation of the first element with respect to the second element brings about a translation of the second element with respect to the first element,
  a locking device including a lock portion movable in rotation with respect to the first element between a locked position wherein the lock portion prevents the rotation of the first element and an unlocked position wherein the lock portion allows rotation of the first element, and a driving member capable of driving in rotation the lock portion toward the unlocked position,
  a lock inhibitor device including an inhibiting part movable in translation with respect to the first element between a first position wherein the inhibiting part allows rotation of the lock portion between the locked position and the unlocked position, and a second position wherein the inhibiting part prevents rotation of the lock portion toward the locked position.

As the lock portion is movable in rotation (and not in translation), the locking device can be designed such that the lock portion is very insensitive to harsh accelerations which can be exerted on the actuation device in the event of a jolt.

Moreover, the locking device can be designed such that the driving member directly drives the lock portion, that is without an intermediate transmission mechanism, such as gearing for example, which generates friction.

It is thus possible to design a device incorporating a driving member with reduced dimensions, as well as a return member with reduced dimensions.

The device can further have the following features:
the lock portion is movable in rotation about an axis parallel to an axis of rotation of the first element,
the locking device includes a tooth fixedly mounted in rotation with the first element, the lock portion being capable, in the locked position, of coming into engagement with the tooth to prevent rotation of the first element,
the tooth is asymmetrical, so that in the locked position, the lock portion prevents the rotation of the first element in a first direction and allows rotation of the first element in a second direction, opposite to the first direction,
the lock portion includes a convex portion and a substantially planar or concave portion, the portions being arranged so that in the locked position, the convex portion is an obstacle to the rotation of the first element, and in the unlocked position, the substantially planar or concave portion allows rotation of the first element,
the driving member includes a rotary electromagnet,
the driving member has an axis of rotation combined with an axis of rotation of the lock portion,
the locking device includes a return member capable of driving the lock portion toward the locked position,
the inhibiting device includes a latch integral in rotation with the lock portion and on opening through which the latch passes when the lock portion is driven in rotation,
when the inhibiting part is in the second position, the inhibiting part obstructs the opening to prevent passage of the latch through the opening,
when the inhibiting device is in the first position, the inhibiting part uncovers the opening to allow passage of the latch through the opening,
the inhibiting part includes a solid portion and an open portion having an opening and, when the inhibiting part is in the first position, the open portion is aligned with the latch to allow the latch to pass through the opening, and when the inhibiting part is in the second position, the solid portion is aligned with the latch to act as an obstacle to rotation of the latch,
the inhibiting device includes a return member capable of driving the inhibiting part toward the second position,
the actuator includes a rod that is movable in translation with respect to the first element, the movable rod being capable of being driven by the second element for displacing the inhibiting element toward the first position,
the movable rod extends at least in part inside the first element,
the device further includes a manual unlocking device to drive in rotation the lock portion so as to bring the lock portion into the unlocked position without activating the driving member,
the driving member includes a rotor and a stator, and the manual unlocking device includes a first part that is movable in rotation with respect to the stator, the first part being capable, when it is driven in rotation in a first direction, to grip the rotor to drive the rotor in rotation so as to displace the lock portion toward the unlocked position, and when it is driven in rotation in a second direction, opposite to the first direction, to become disengaged from the rotor,
the manual unlocking device includes a second part that is fixed with respect to the stator, and a third part movably mounted in translation with respect to the first part and integral in rotation with the first part, and the third part includes a pin capable of sliding in an opening made in the second part to guide the translation of the third part with respect to the first and second parts and/or to guide the rotation of the second and third parts with respect to the first part,
the first element is the screw and the second element is the nut.

PRESENTATION OF THE DRAWINGS

Other features and advantages will yet be revealed from the description hereafter, which is purely illustrative and not limiting and must be read with reference to the appended figures, among which.

DETAILED DESCRIPTION OF ONE EMBODIMENT

Figure 1:
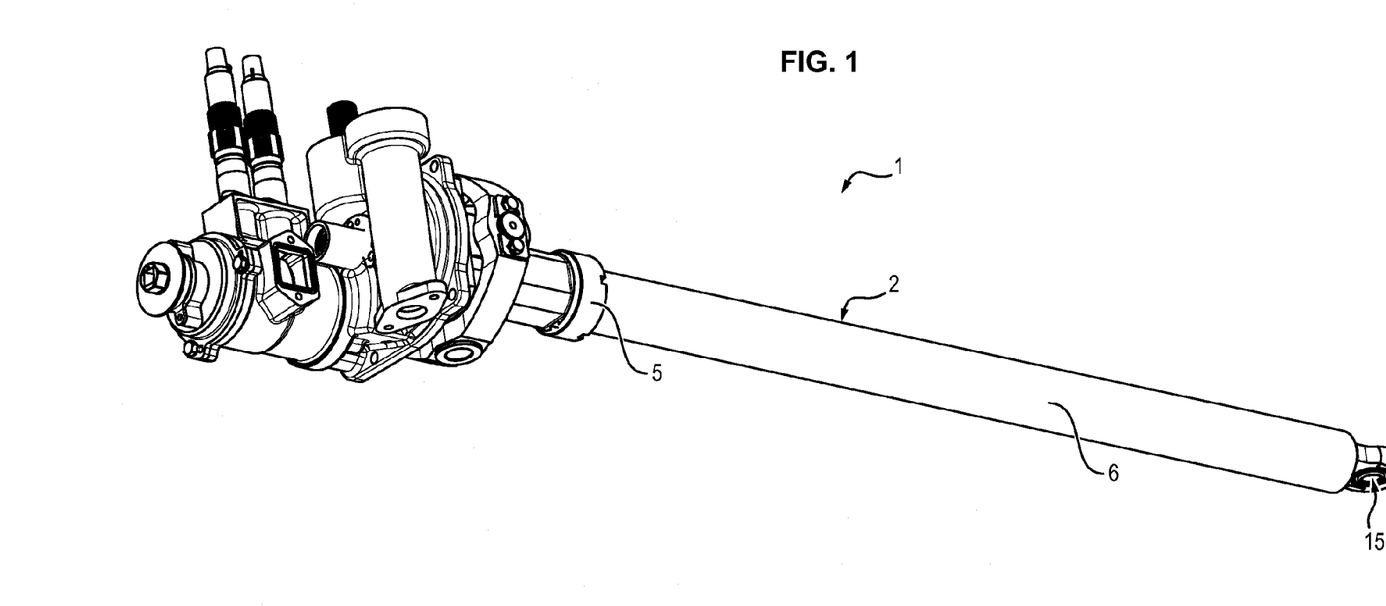
FIG. 1 shows schematically in perspective an actuation device conforming to one embodiment of the invention.
Figure 2A:
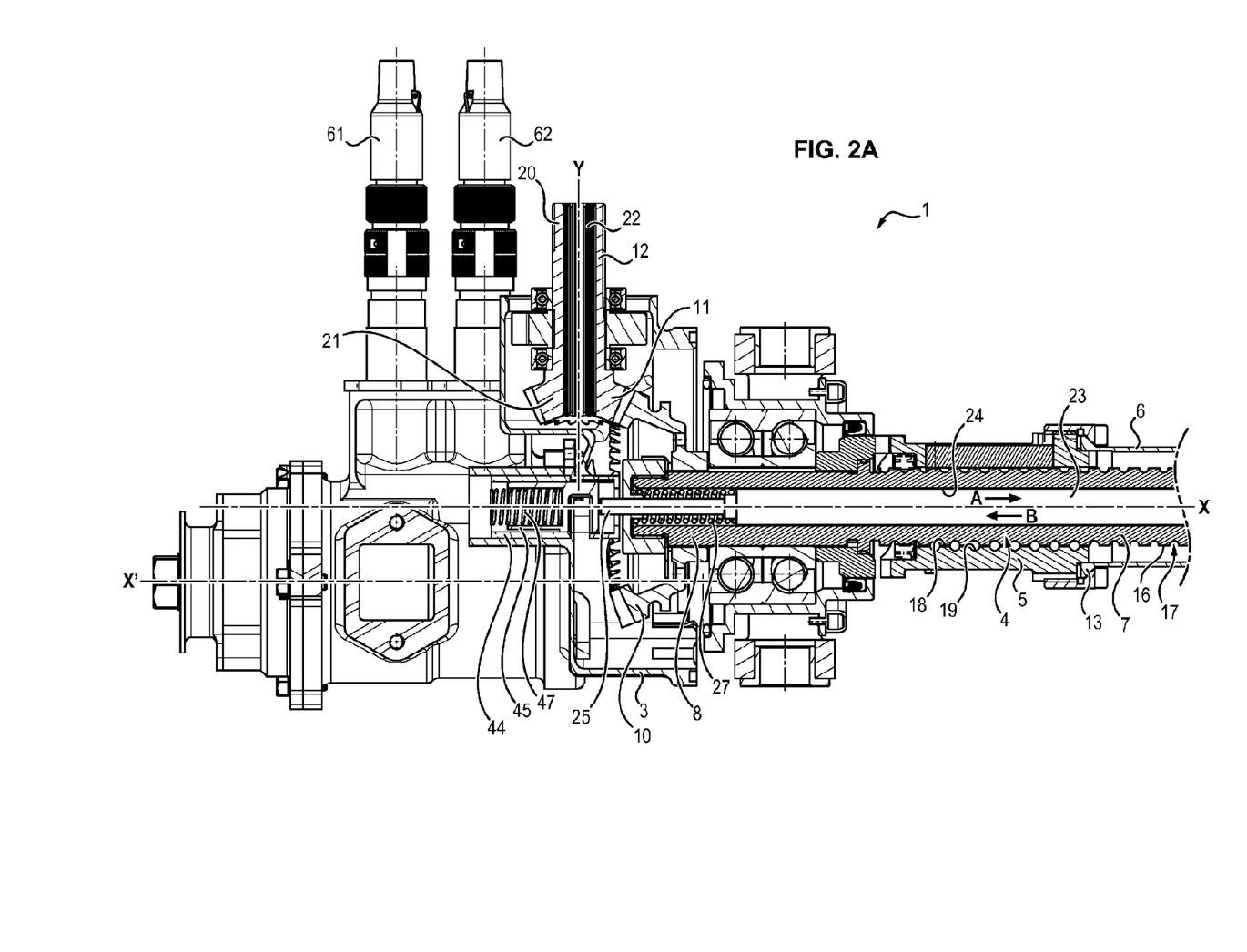
FIGS. 2A and 2B show schematically the device, in longitudinal section.
Figure 2B:
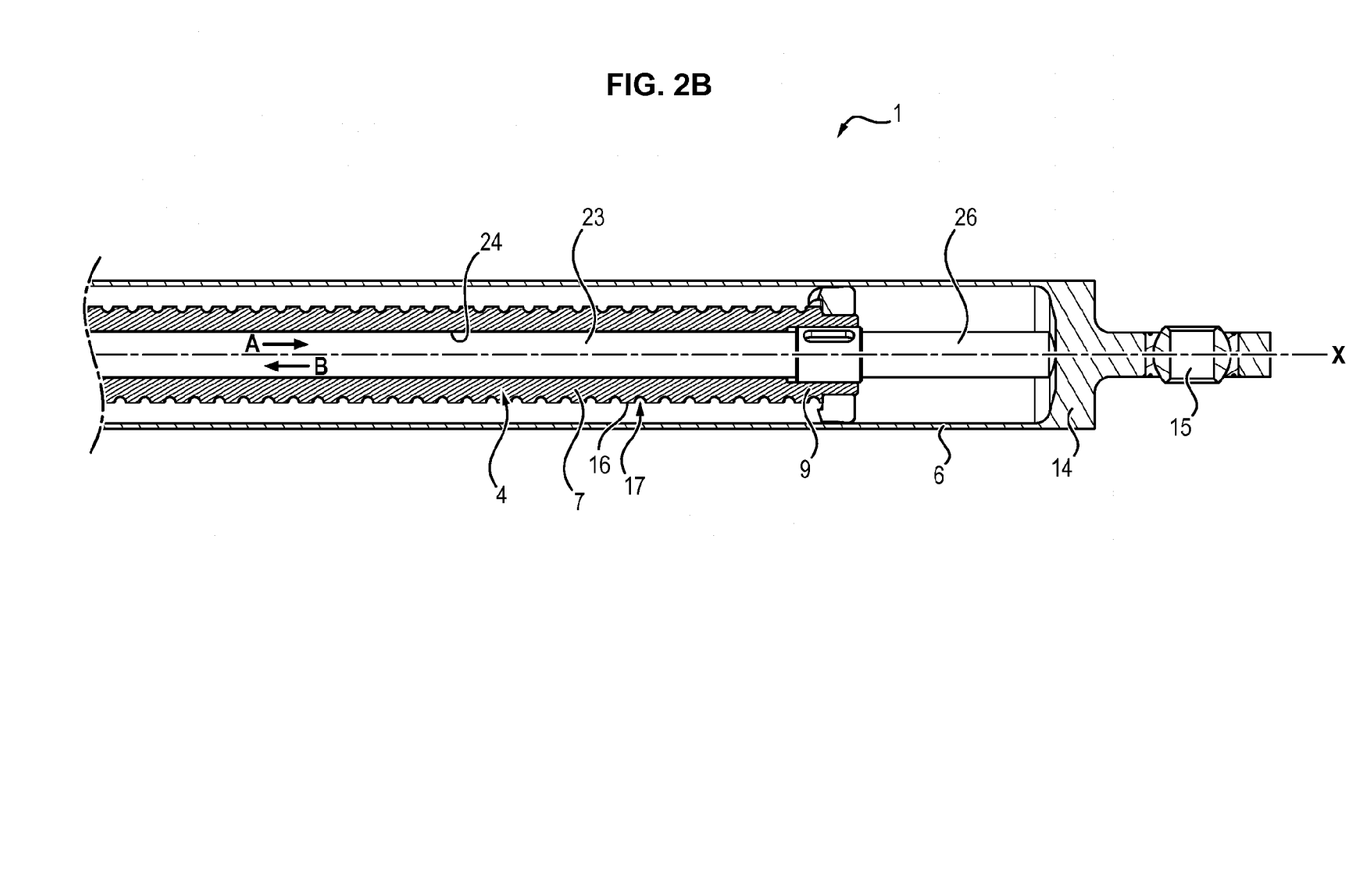

In FIGS. 1, 2A and 2B, the device 1 shown includes an actuator 2. The actuator 2 includes a casing 3, a screw 4 extending from the casing 3, a nut 5 and an actuator tube 6.

The screw 4 has a body 7 with the general shape of an elongated cylinder. The screw 4 is rotatably mounted with respect to the casing 3 of the device about an axis of rotation X corresponding to the longitudinal axis of the body 7 and also corresponding to a deployment axis of the actuator 2.

The screw 4 includes a first end 8 (or receiving end) designed to receive a driving torque and a second end 9, opposite to the first end 8. The actuator 2 includes an input bevel gear 10 mounted integral with the screw 4, at the first end 9 of the screw 4. The input bevel gear 10 meshes with a gearing portion 11 of a drive shaft 12, so as to transmit a rotary movement of the drive shaft 12 to the screw 4.

The nut 5 extends around the body 7 of the screw 4. The nut 5 is fixed to the actuator tube 6. The actuator tube 6 has a first end 13 connected to the nut 5 and a second end 14 connected to a movable component of the thrust reverser (not shown), such as a movable cover for example, through a ball-and-socket connection 15.

The nut 5 is movably mounted in translation with respect to the screw 4 along the longitudinal axis X of the screw 4 between two extreme positions, corresponding respectively to a retracted configuration and a deployed configuration of the actuator 2.

The body 7 of the screw 4 has a cylindrical outer surface 16 wherein is formed a helical groove 17. The nut 5, for its part, has a cylindrical inner surface 18 wherein is also formed a helical groove 19. The screw 4 and the nut 5 cooperate with one another through helical grooves 17 and 19 wherein balls are accommodated, so that a rotation of the screw 4 with respect to the nut 5 brings about concomitantly a translation of the nut 5 with respect to the screw 4 in the X direction.

To deploy the actuator 2, the screw 4 is driven in rotation about the axis X in a first direction of rotation, so that the nut 5 is displaced along the screw in a first direction (arrow A) extending from the first end 9 of the screw 4 toward the second end 10 of the screw 4.

To retract the actuator 2, the screw 4 is driven in rotation about the axis X in a second direction of rotation, opposite to the first direction of rotation, so that the nut 5 is displaced along the screw in a second direction (arrow B) extending from the second end 10 of the screw 4 toward the first end 9 of the screw 4.

The device 1 also includes a drive shaft 12 movably mounted in rotation with respect to the casing 3 about an axis Y, perpendicular to the axis X. The drive shaft 12 has a first end 20 and a second end 21. The first end 20 is configured to be able to connect to a first motor shaft of a thrust reverser or flexible shaft (not shown), the first motor shaft being connected to a drive motor positioned remotely from the actuation device 1. To this end, the drive shaft 12 has a bore with splines 22. The second end 21 includes a gearing portion 11 forming a bevel wheel arranged to mesh with the input bevel gear 10 of the screw 4 so as to drive the screw 4 in rotation.

When the motor is activated, the rotation of the screw 4 about the axis X concomitantly results in a translation of the nut 5 parallel to the axis X between a first extreme position (corresponding to a retracted configuration of the actuator) wherein the movable component of the thrust reverser is retracted and second extreme position (corresponding to a deployed configuration of the actuator) wherein the movable component of the thrust reverser is deployed thus allowing the flow of air circulating in the air stream of the fan to be diverted toward the front of the nacelle.

The actuator 2 also includes a rod 23 movable in translation with respect to the screw 4. To this end, the screw 4 includes an axial bore 24 extending along the axis X, from the first end 8 of the screw 4 to the second end 9 of the screw 4, and the rod 23 is slidably mounted inside the bore 24. The rod 23 has a first end 25 and a second end 26, both capable of protruding outside the screw 4, respectively at the first end 8 and the second end 9 of the screw 4.

The actuator 2 also includes a return member 27 capable of driving the rod 23 toward the second end 9 of the screw 4 (in the direction of arrow A). The return member 27 is in this case a compression spring mounted between the body of the screw 4 and the movable rod 23.

Due to the presence of the return member 27, the second end 26 of the rod 23 is held in contact with the second end 14 of the actuator tube 6.

In this manner, when the actuator 1 is in the retracted configuration, the actuator tube 6 drives the rod 23 in the direction of the first end 8 of the screw 4 (in the direction of arrow B), countering the return force exerted by the return member 27. In this configuration (illustrated in FIGS. 2 and 3), the first end 25 of the movable rod 23 protrudes from the screw 4 on the side of the first end 8 of the screw 4.

Figure 6:
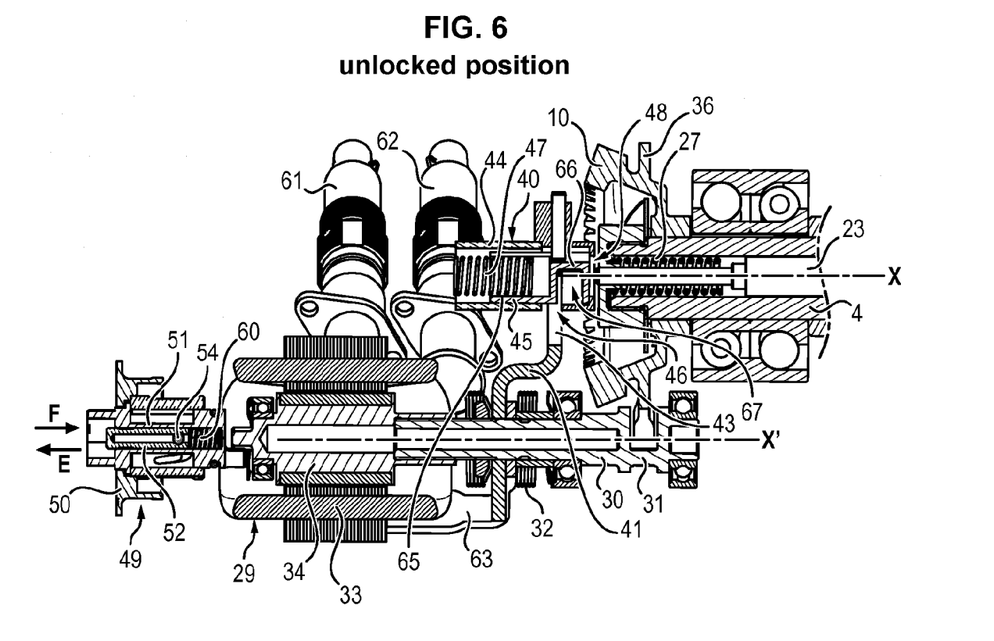
FIGS. 6 and 7 are partial views, in section and in perspective, of the actuation device, when the lock portion is in the unlocked position.
Figure 7:
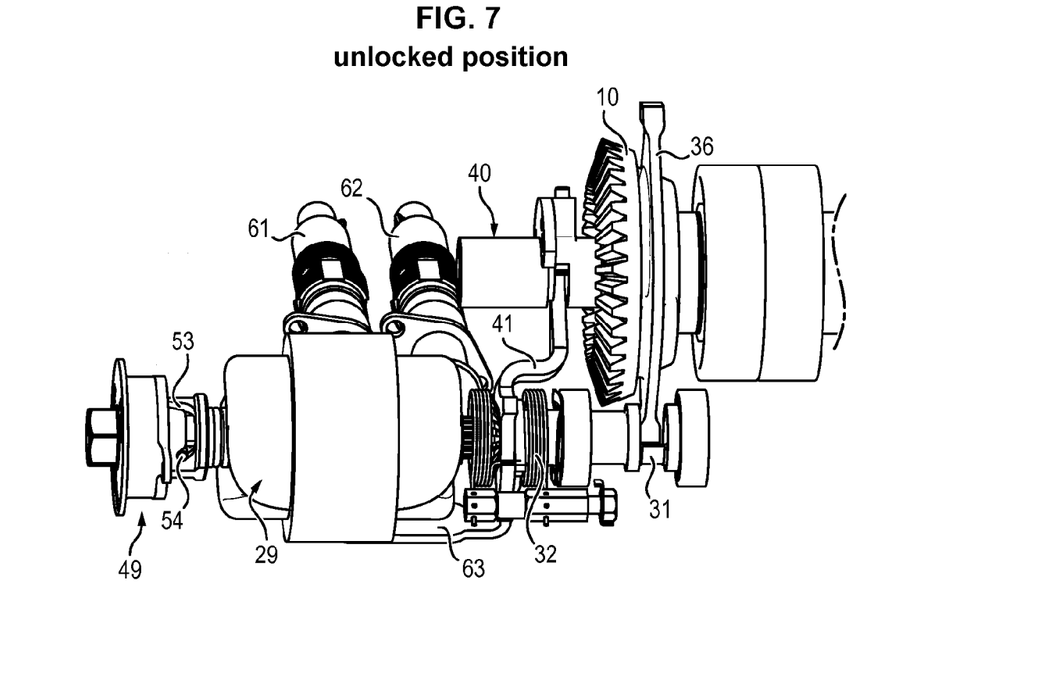

Conversely, when the actuator 2 is in the deployed configuration, the actuator tube 6 does not drive the rod 23. Only the return member 27 exerts an axial force on the rod 23 in the direction of the second end 9 of the screw 4 (in the direction of arrow A). In this configuration (illustrated in FIG. 6), the first end 25 of the movable rod does not protrude from the screw 4 on the side of the first end 8 of the screw 4.

The device 1 also includes a locking device 28 visible in FIGS. 3 to 10.

The locking device 28 is accommodated inside the casing 3 of the actuator 2. The locking device 28 has the function of blocking the screw 4 in rotation when the actuator is in its retracted configuration, and thus avoiding an untimely deployment of the actuator 2, particularly during flight.

The locking device 28 generally includes a driving member 29, a locking shaft 30 having a lock portion 31, and a return member 32.

The driving member 29 is a rotary electromagnetic driving member. The driving member 29 includes a stator 33 fixedly mounted on the casing 3 of the actuator 2, and a rotor 34 designed to be driven in rotation with respect to the stator 33 on an axis of rotation X' parallel to the axis X.

The stator 33 includes an excitation winding which, when it is supplied with electrical current, generates a magnetic excitation field. The rotor 34 includes a magnetic core 35 which, under the influence of the magnetic excitation field generated by the excitation winding of the stator 33, is driven in rotation with respect to the stator 33.

The driving member 29 is able to drive in rotation the locking shaft 30.

To this end, the locking shaft 30 has a first end connected to the rotor 34 of the driving member 29, and a second end from which extends the lock portion 31. Moreover, the locking shaft 30 has a longitudinal direction extending along the axis of rotation X'. The locking shaft 30 is mounted integral with the rotor 34 of the driving member 29.

The driving member 29 is arranged to drive the locking shaft and thus the lock portion 31 in rotation with respect to the casing 3 about the axis of rotation X'.

Moreover, the input bevel gear 10 of the actuator 2 has a locking ring 36 having two serrations 37 arranged in diametrically opposed positions with respect to the locking ring 36.

Figure 5:
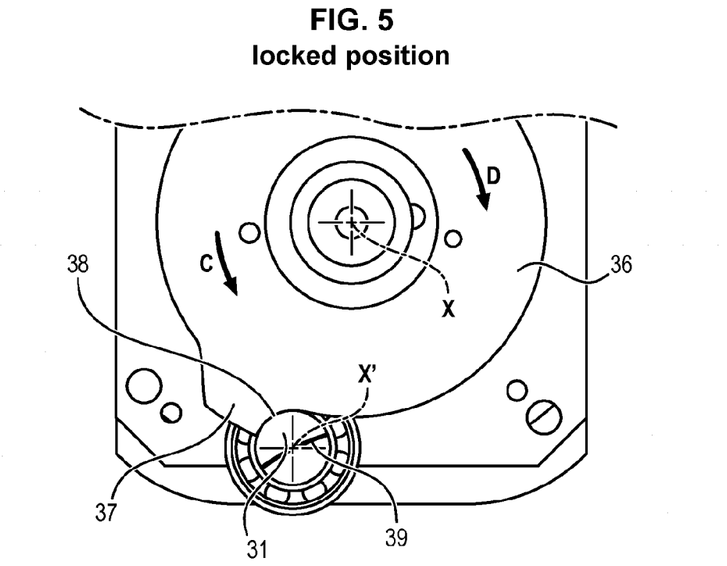
FIG. 5 shows schematically the lock portion in the locked position.
Figure 8:
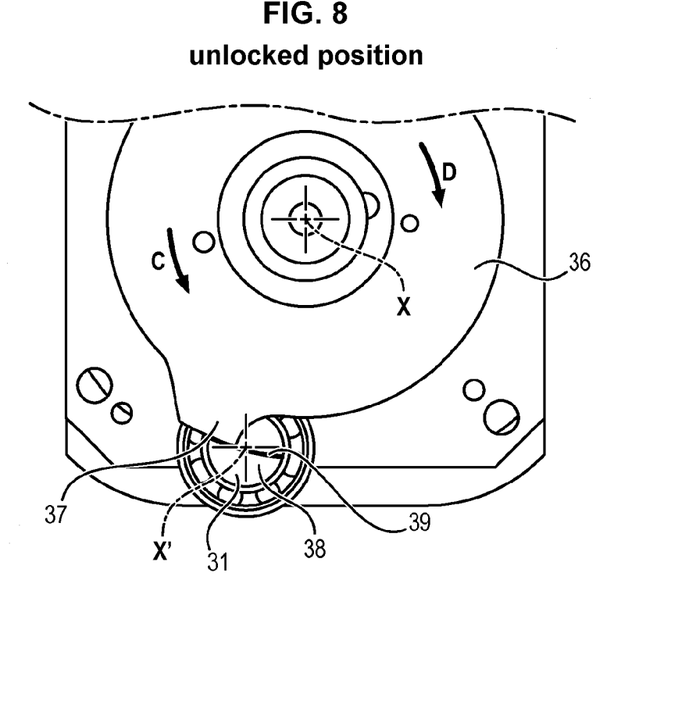
FIG. 8 shows schematically the lock portion in the unlocked position.

As shown in FIGS. 5 and 8, the lock portion 31 is a half-moon-shaped bolt. More precisely, the lock portion 31 includes a first portion 38 with a convex shape and a second portion 39 with a flat or substantially concave shape. The first portion 38 and the second portion 39 are arranged to be selectively positioned facing the locking ring 36 when the lock portion 31 is driven in rotation about the axis X' by the driving member 29.

The lock portion 31 is capable of being driven in rotation between a locked position (illustrated in FIG. 5) wherein the lock portion 31 prevents the rotation of the screw 4 of the actuator 2, and an unlocked position (illustrated in FIG. 8) wherein the lock portion 31 allows rotation of the screw 4 of the actuator 2.

In the locked position (FIG. 5), the first portion 38 of the lock portion 31 comes into engagement with a serration 37 of the locking ring 36 to prevent rotation of the screw 4 in a first direction (arrow C) corresponding to the direction of rotation of the screw 4 during deployment of the actuator 2.

In the unlocked position (FIG. 8), the first portion 38 of the lock portion 31 is disengaged from the serration 37 and the second portion 39 of the lock portion allows rotation of the screw 4.

The serrations 37 of the locking ring 36 are asymmetrical, so that when the lock portion 31 is in the locked position (FIG. 5), the lock portion 31 prevents rotation of the screw 4 in the first direction (arrow C) corresponding to the direction of rotation of the screw 4 during deployment of the actuator, but allows rotation of the screw 4 in a second direction (arrow D) opposite the first direction and corresponding to the direction of rotation of the screw 4 during retraction of the actuator.

In other words, when the lock portion 31 is in the locked position, a retraction of the actuator 2 is possible while deployment of the actuator 2 is impossible.

The return member 32 is capable of driving the lock portion 31 toward the locked position. In other words, the return member 32 exerts a return torque which counters a rotation of the lock portion 31 toward the unlocked position caused by the drive member 29. The return member 32 is a torsion spring arranged between the casing 3 of the actuator 2 and the locking shaft 30. The spring is a helical spring extending about the locking shaft 30.

The actuation device 1 also includes a lock inhibitor device 40 housed inside the casing 3 of the actuator 2. The lock inhibitor device 40 has the function of holding the lock portion 31 in the unlocked position as long as the actuator 2 is not totally retracted, so as to avoid untimely locking of the actuator 2 which could block the actuator 2 during its deployment, particularly during landing.

The lock inhibitor device 40 includes a latch 41 mounted integral with the locking shaft 30. The latch 41 extends in a substantially radial direction with respect to the axis X'. Thus, when the driving member 29 is activated, it simultaneously drives in rotation the lock portion 31 and the latch 41.

The latch 41 has a first end 42 fixed to the locking shaft 30 and a second free end 43, opposite to the first end 42. The second end 43 extends remotely from the axis X'.

The lock inhibitor device 40 also includes a sleeve 44 fixedly mounted with respect to the casing 3 and an inhibiting part 45 (or strike) that is movable in translation with respect to the sleeve 44, in a translation direction parallel to the axis X.

More precisely, the inhibiting part 45 is slidably mounted inside the sleeve 44. The sleeve 44 extends in the continuation of the screw 4 of the actuator 2.

Thus the inhibiting part 45 is movable in translation with respect to the casing 3 parallel to the axis X.

The inhibiting part 45 is movable between a first position (shown in FIGS. 3 and 4) wherein the inhibiting part 45 allows rotation of the latch 41, and a second position (shown in FIGS. 6 and 7) wherein the inhibiting part 45 serves as an obstacle to the rotation of the latch 41.

More precisely, the sleeve 44 includes an opening 46, in the shape of a slot extending parallel to a plane transverse to the axis X. The opening 46 is dimensioned so as to allow passage of the free end 43 of the latch 41 through the opening 46 during rotation of the latch 41.

The inhibiting part 45 includes a body 64 which includes a solid portion 65 and an open portion 66. The open portion 66 has an opening 67.

When the inhibiting part 45 is in the first position (FIGS. 3 and 4) the inhibiting part 45 does not obstruct the opening 46. Indeed, in this position, the opening 67 of the inhibiting part 45 coincides with the opening 46 of the sleeve 44. Moreover, the opening 67 of the inhibiting part 45 is aligned with the free end 43 of the latch 41. In this manner, when the latch 41 is driven in rotation about the axis X', the free end 43 of the latch 41 passes freely through the openings 46 and 67.

When the inhibiting part 45 is in the second position (FIGS. 6 and 7), the inhibiting part obstructs the opening 46 so that in the event of rotation of the latch 41, the latch 41 comes into abutment against the inhibiting part 45. Indeed, in this position, the opening 67 of the inhibiting part 45 is offset with respect to the opening 46 of the sleeve 44. The opening 46 of the sleeve 44 is obstructed by the full part 65 of the inhibiting part 45, so that the latch 41 comes into abutment with the solid portion 65 of the inhibiting part 45.

The lock inhibitor device 40 also includes a return member 47 capable of driving the inhibiting part 45 toward the second position (in the direction of arrow A). The return member 47 is a compression spring extending between the sleeve 44 and the inhibiting part 45.

Furthermore, the sleeve 44 has an orifice 48 allowing penetration of the first end 25 of the movable rod 23 inside the sleeve 44. In this manner, the movable rod 23 is able to drive the inhibiting part 45 toward the first position (in the direction of arrow B), countering the force exerted by the return member 47.

The actuation device 1 also includes a manual unlocking device 49 including a housing 50 mounted integral with the casing 3 of the actuator 2, a socket 51 rotatably mounted in the housing 50 and a rod 52 movably mounted in translation inside the socket 51 and integral in rotation to the socket 51.

The socket 51 makes it possible to manually command a rotation of the locking shaft 30, and consequently of the lock portion 31, so as to unlock the locking device 28, without activating the driving member 29. To this end, the socket 51 includes a serration 69 capable of cooperating with a serration 68 of the rotor 34 of the driving member 29 to drive the rotor 34 in rotation.

The socket 51 has an inner longitudinal bore wherein the rod 52 extends. The socket 51 has two oblong longitudinal slots. The rod 52 includes two pins 54 extending from the longitudinal portion of the rod 52 in a radial direction. The pins 54 extend through the slots and are designed to slide longitudinally along the slots. Thus the rod 52 is integral in rotation with the socket 51 while remaining movable in translation with respect to the socket 51.

Figure 15:
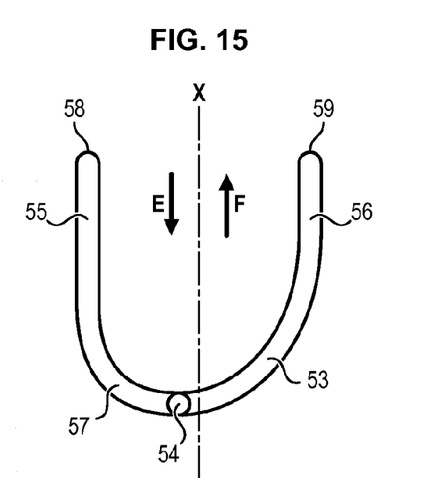
FIG. 15 shows schematically an opening and a pin of the manual unlocking device.

Moreover, the housing 50 includes a wall wherein is formed a lumen 53 with the general shape of a U. As shown in FIG. 15, the lumen 53 has two longitudinal branches 55 and 56 and a transverse portion 57 connecting the two branches, the transverse portion 57 being positioned on the side of the driving member 29 and the ends 58 and 59 of the branches 55 and 56 being oriented toward a side opposite to the driving member 29.

One of the pins 54 extends through the U-shaped lumen 53 provided in the wall of the housing 50.

The pin 54 is able to slide from one end 58 to the other 59 of the lumen 53. When the pin 54 is in one or the other of the branches 55, 56 of the U-shaped lumen 53, the rod 52 can slide inside the screw parallel to the axis X'. When the pin 54 is in the transverse portion 57 of the lumen 53, the socket 51+rod 52 assembly can turn with respect to the housing 50 about the axis X'.

Moreover, the manual unlocking device 49 includes a return member 60 capable of driving the rod 52 in a first direction (arrow E) tending to move the rod 52 away from the rotor 34. In other words, the return member 60 exerts on the rod 52 a return force tending to hold the pin 54 in a branch 55, 56 of the lumen 53. The return member 60 is for example a compression spring arranged between the rod 52 and the housing 50.

Finally, the actuation device 1 includes two position sensors 61 and 62 mounted on the casing 3 of the actuator 2. The sensors 61 and 62 are arranged to detect the position of the lock portion 31 (locked position or unlocked position). To this end, the actuation device 1 also includes a target 63 mounted integral with the locking shaft 30. Thus the target 63 is driven in rotation by the driving member 29 about the axis X' at the same time as the lock portion 31.

When the lock portion 31 is in the locked position, the target 63 is positioned facing the sensors 61 and 62. Each sensor 61, 62 detects the presence of the target 63. When the lock portion 31 is in the unlocked position, the target 63 is no longer positioned facing the sensors 61 and 62. Each sensor 61, 62 detects the absence of the target 63. The presence or absence of the target 63 in front of the sensors 61, 62 makes it possible to check that the lock portion 31 is in the locked or unlocked position.

The operation of the actuation device that was just described is the following.

Figure 3:
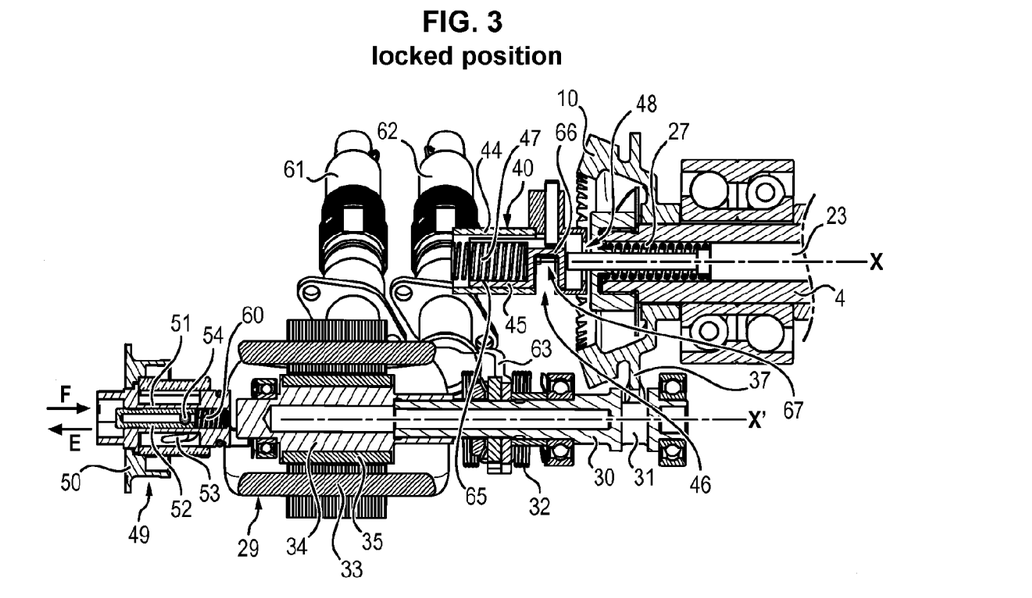
FIGS. 3 and 4 are partial views, in section and in perspective, of the actuation device, when the lock portion is in the locked position.
Figure 4:
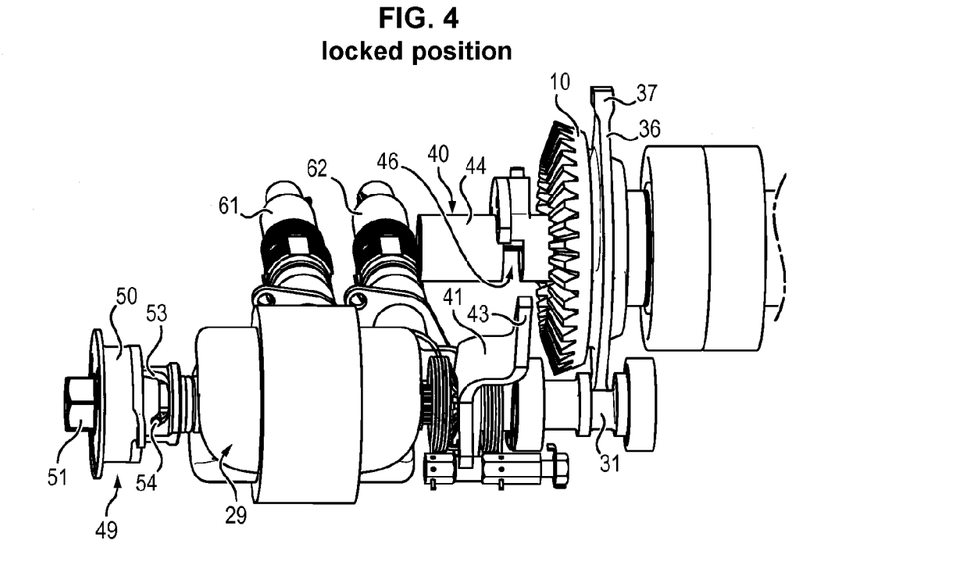

Initially, the actuator 2 is in the retracted configuration and the lock portion 31 is in the locked position as illustrated in FIGS. 3 to 5. In this position, the lock portion 31 is engaged with one of the serrations 37 to prevent rotation of the screw 4 in the first direction (arrow C). The lock portion 31 is held in the locked position under the influence of the return torque exerted by the return member 32 on the drive shaft 30. In this position, the lock portion 31 prevents an untimely deployment of the actuator 2.

Moreover, the inhibiting part 45 is in the first position (FIGS. 3 and 4). In other words, the inhibiting part 45 does not obstruct the opening 46 of the sleeve 44.

When the pilot commands deployment of the thrust reverser, a control system triggers the supply of power to the driving member 29. The driving member 29 then applies an unlocking torque to the locking shaft 30. The unlocking torque applied by the driving member 29 opposes the torque exerted by the return member 32, which has the effect of causing the locking shaft 30 to turn, including the lock portion 31, about the axis X'. The driving member 29 drives in rotation the lock portion 31 which passes from the locked position (shown in FIG. 5) to the unlocked position (shown in FIG. 8).

The rotation of the lock portion 31 has the effect of disengaging the convex portion 38 from the lock portion 31 of the serration 37.

What is more, the driving member 29 also drives in rotation the latch 41. This has the effect that the free end 43 of the latch 41 passes through the opening 46 of the sleeve 44.

Once the lock portion 31 is in the unlocked position (FIGS. 6 to 8), the actuator can be deployed. Indeed, the lock portion 31 no longer opposes the rotation of the screw 4 in the first direction (arrow C).

The screw 4 is driven in rotation in the first direction so that the nut 5 translates along the screw 4 in the X direction while moving away from the first end 8 (or receiving end) of the screw 4 and approaching the second end 9. The nut 5 is displaced along the screw in the first direction (arrow A).

While the nut 5 moves away from the first end 8 of the screw 4, the actuator tube 6 ceases to drive the movable rod 23. Consequently, the movable rod 23 moves with respect to the screw 4 in the first direction (arrow A) under the influence of the return member 27, so that the movable rod 23 ceases to drive the inhibiting part 45. The inhibiting part 45 is displaced in translation along the axis X toward the second position (FIG. 6) under the influence of the return member 47.

This has the effect that the inhibiting part 45 obstructs the opening 46 of the sleeve 44 (FIGS. 6 and 7), thereby preventing rotation of the latch 41, and consequently a return of the lock portion 31 toward the locked position.

From that moment, the driving member 29 can be deactivated without the lock portion 31 being able to return to the locked position. Indeed, the inhibiting part 45 holds the lock portion 31 in the unlocked position.

This has the consequence that the actuator 2 cannot be locked as long as the nut 5 has not returned to the retracted position, that is as long as the actuator 2 has not returned to the retracted configuration.

Figure 9:
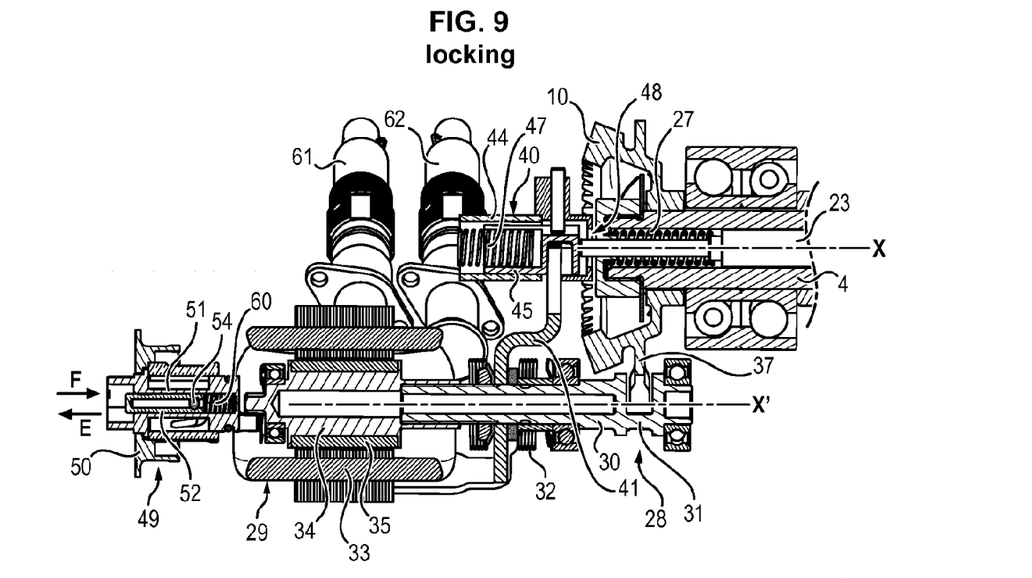
FIGS. 9 and 10 are partial views, in section and in perspective, of the actuation device, when the lock portion is in the process of locking.
Figure 10:
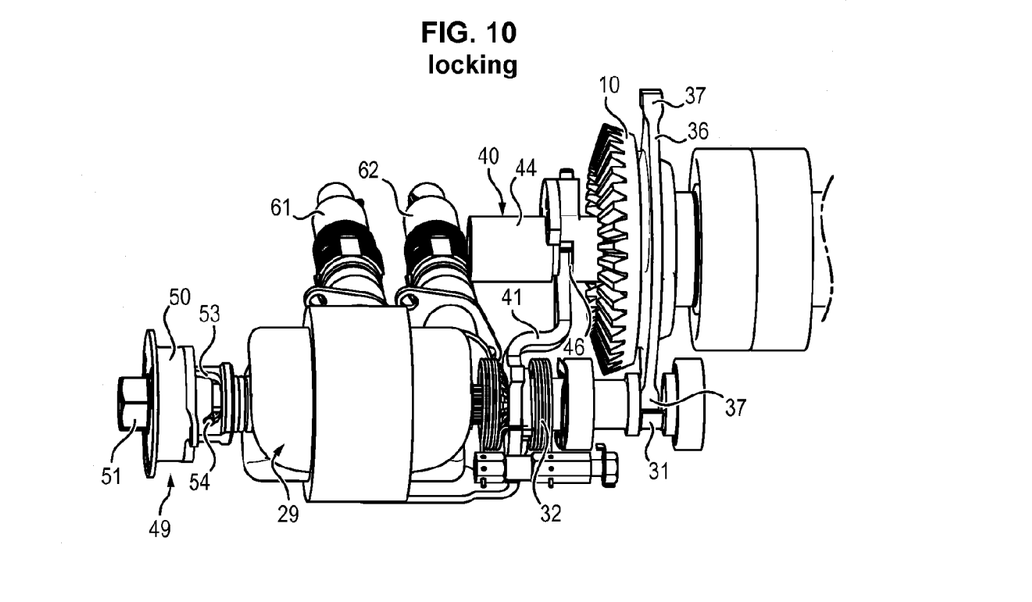
Figure 11:
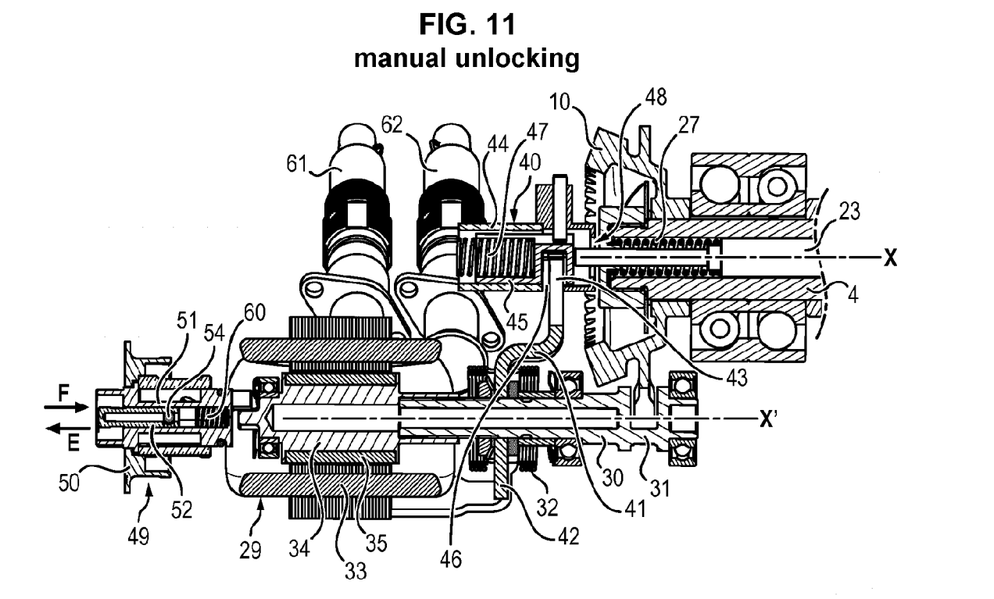
FIGS. 11 and 12 are partial views, in section and in perspective, of the actuation device when the lock portion is manually unlocked.
Figure 12:
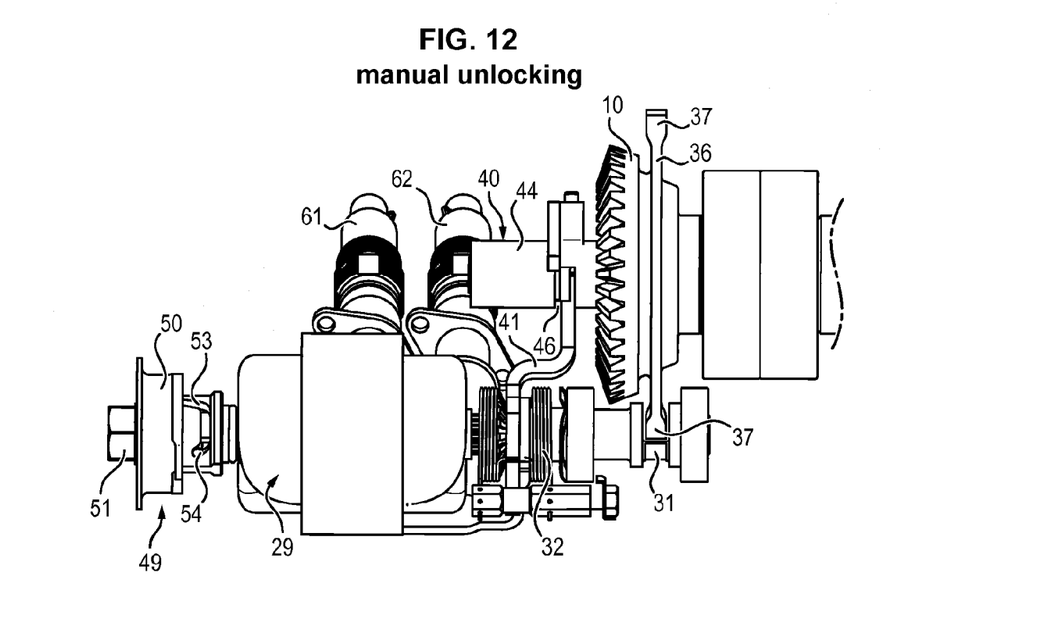
Figure 13:
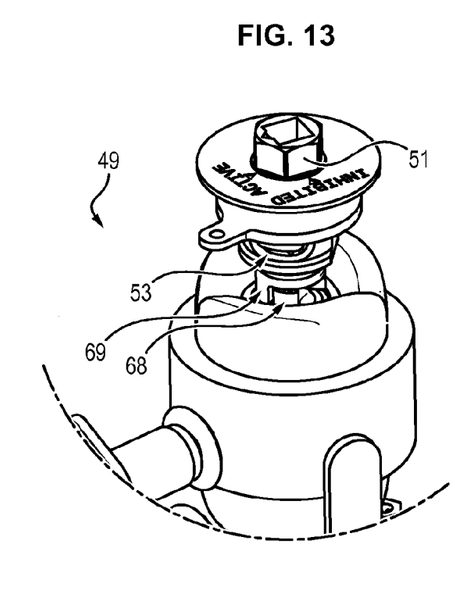
FIGS. 13 and 14 are detail views of the manual unlocking device, respectively in the locked position and in the unlocked position.
Figure 14:
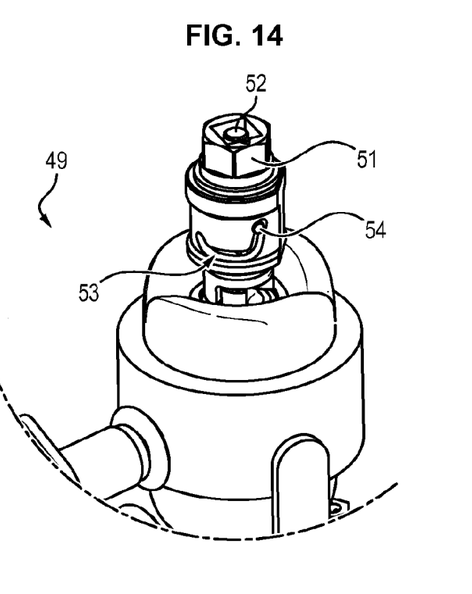

When the thrust reverser retracts, the screw 4 of the actuator is driven in rotation in the second direction (arrow D) so that the nut 5 translates along the screw 4 in the direction X toward the first end (or receiving end) of the screw 4. When the nut 5 approaches the first end 8, the actuator tube 6 drives the movable rod 23 counter to the return member 27. The movable rod 23 drives the inhibiting part 45 counter to the return member 47 (FIGS. 9 and 10). Under the influence of the drive exerted by the movable rod 23, the inhibiting part 45 is displaced in translation along the axis X toward the first position (in the direction of the arrow B).

When the inhibiting part 45 attains the first position (FIGS. 9 and 10), the inhibiting part 45 no longer obstructs the opening 46, thus allowing rotation of the latch 41, and consequently of the lock portion 31.

Under the influence of the return member 32, the lock portion 31 is driven in rotation toward the locked position.

In this manner, the complete retraction of the actuator 2 brings about an automatic return of the lock portion 31 into the locked position. Once the lock portion 31 is in the locked position, the locking device 28 can no longer be unlocked, unless the pilot again commands the deployment of the thrust reverser, which triggers activation of the driving member 29.

To make it possible to accomplish maintenance operations, it is nevertheless possible to unlock the actuator 2 without activating the drive member 29, thanks to the manual unlocking device 49.

Manual unlocking is accomplished in the following manner.

The pin 54 is initially positioned at the end 58 of the first branch 55 of the lumen 53. The pin 54 is maintained in this position by the return member 60.

The operator uses a wrench to successively:
press the rod 52 counter to the return member 60 (in the first direction corresponding to the arrow E), which has the effect, on the one hand, of displacing the rod 52 in translation in the first direction with respect to the housing 50 parallel to the axis X, and on the other hand to cause the pin 54 to slide in the first branch 55 of the lumen 53, then
cause the rod 52 +socket 51 assembly to turn with respect to the housing 50, which has the effect, on the one hand, of causing the rotor 34 of the driving member 29 to turn by means of the serrations 68 and 69, and on the other hand to cause the pin 54 to slide in the transverse portion 57 of the lumen 53.

Rotation of the rotor 34 of the driving member 29 causes concomitantly a rotation of the lock portion 31 toward the unlocked position.

Once the lock portion 31 is in the unlocked position, the operator releases the pressure force exerted on the rod 52. Under the influence of the return member 60, the rod 52 is displaced in translation in the second direction (arrow F), opposite to the first direction with respect to the housing 50, parallel to the axis X.

The displacement of the rod 52 in the second direction has the effect of causing the pin 54 to slide in the second branch 56 of the lumen 53 until the end 59 of the second branch 56.

In this position, the pin 54 blocks the rod 52 in rotation and prevents a return of the lock portion 31 in the locked position.

Once the maintenance operation is completed, the operator relocks the actuator 2 in the following manner.

The operator uses the wrench to press again on the rod 52 counter to the return member 60 (in a first direction corresponding to the arrow E), which has the effect, on the one hand, of displacing the rod 52 in translation in the first direction with respect to the housing 50 parallel to the axis X, and on the other hand to cause the pin 54 to slide in the second branch 56 of the lumen 53.

When the pin 54 reaches the transverse portion 57 of the lumen, the lock portion 31 is displaced toward the locked position under the influence of the return member 32 of the locking device 28. The pin 54 slides in the transverse portion 57 of the lumen toward the first branch 55.

Then, when the pin 54 reaches the first branch 55, the pin slides in the lumen 53 until the end 58 of the first branch 55, under the influence of the return member 60 of the manual unlocking device 49. In this position, the serration 69 no longer interacts with the serration 68. Consequently, the rotor 34 is free to turn with respect to the socket 51. Thus, the rotor 34 is no longer in engagement with the manual unlocking device 49.

The invention claimed is:

1. An actuation device for displacing the movable cover of a thrust reverser, including:
    an actuator including a first element and a second element movably mounted in translation with respect to the first element, one of the first element and the second element being a screw, and the other being a nut capable of cooperating with the screw, so that a rotation of the first element with respect to the second element brings about translation of the second element with respect to the first element,
    a locking device including a lock portion movable in rotation with respect to the first element between a locked position wherein the lock portion prevents rotation of the first element and an unlocked position wherein the lock portion allows rotation of the first element, and a drive member capable of driving in rotation the lock portion toward the unlocked position,
    a lock inhibitor device including an inhibiting part movable in translation with respect to the first element between a first position wherein the inhibiting part allows rotation of the lock portion between the locked position and the unlocked position, and a second position wherein the inhibiting part prevents rotation of the lock portion toward the locked position.

2. The device according to claim 1, wherein the lock portion is movable in rotation about an axis (X') parallel to an axis (X) of rotation of the first element.

3. The device according to claim 1, wherein the locking device includes a tooth mounted integral in rotation with the first element, the lock portion being capable, in the locked position, to come into engagement with the tooth to prevent rotation of the first element.

4. The device according to claim 3, wherein the tooth is asymmetrical so that in the locked position, the lock portion prevents rotation of the first element in a first direction (C) and allows rotation of the first element in a second direction (D), opposite to the first direction.

5. The device according to claim 1, wherein the lock portion includes a convex portion and a substantially planar portion arranged so that, in the locked position, the convex portion is an obstacle to the rotation of the first element, and in the unlocked position, the substantially planar portion allows rotation of the first element.

6. The device according to claim 1, wherein the driving member includes a rotary electromagnet.

7. The device according to claim 6, wherein the driving member has an axis of rotation (X') combined with an axis of rotation of the lock portion.

8. The device according to claim 1, wherein the locking device includes a return member capable of driving the lock portion toward the locked position.

9. The device according to claim 1, wherein the inhibiting device includes a latch integral in rotation with the lock portion and an opening through which the latch passes when the lock portion is driven in rotation.

10. The device according to claim 9, wherein, when the inhibiting part is in the second position, the inhibiting part obstructs the opening to prevent passage of the latch through the opening.

11. The device according to claim 9, wherein, when the inhibiting part is in the first position, the inhibiting part uncovers the opening to allow the passage of the latch through the opening.

12. The device according to claim 9, wherein the inhibiting part includes a full portion and an open portion having an opening, and wherein, when the inhibiting part is in the first position, the open portion is aligned with the latch to allow the latch to pass through the opening, and when the inhibiting part is in the second position, the full portion is aligned with the latch to form an obstacle to a rotation of the latch.

13. The device according to claim 1, wherein the inhibiting device includes a return member capable of driving the inhibiting part toward the second position.

14. The device according to claim 1, wherein the actuator includes a rod movable in translation with respect to the first element, the movable rod being able to be driven by the second element to displace the inhibiting part toward the first position.

15. The device according to claim 14, wherein the movable rod extends at least partially inside the first element.

16. The device according to claim, further including a manual unlocking device to drive in rotation the lock portion so as to bring the lock portion into the unlocked position without activating the driving member.

17. The device according to claim 16, wherein the driving member includes a rotor and a stator, and the manual unlocking device includes a first part movable in rotation with respect to the stator, the first part being capable, when it is driven in rotation in a first direction, to come into engagement with the rotor to drive in rotation the rotor so as to displace the lock portion toward the unlocked position, and when it is driven in rotation in a second direction, opposite to the first direction, to become disengaged from the rotor.

18. The device according to claim 17, wherein the manual unlocking device includes a second part, fixed in relation to the stator and a third part movably mounted in translation with respect to the first part, and integral in rotation with the first part, and wherein the third part includes a pin capable of sliding in a lumen made in the second part to guide the translation of the third part with respect to the first and second parts and/or to guide the rotation of the second and third parts with respect to the first part.

19. The device according to claim 1, wherein the first element is the screw and the second element is the nut.

* * * * *

UNITED STATES PATENT AND TRADEMARK OFFICE
CERTIFICATE OF CORRECTION

| | |
|---|---|
| PATENT NO. | : 9,458,795 B2 |
| APPLICATION NO. | : 14/778972 |
| DATED | : October 4, 2016 |
| INVENTOR(S) | : Mickael Werquin, Denis Dauvergne and Oleg Gomolko |

Page 1 of 1

It is certified that error appears in the above-identified patent and that said Letters Patent is hereby corrected as shown below:

On Column 12, Claim 16, Line 50, please delete "claim" and insert -- claim 1 --

Signed and Sealed this
Seventeenth Day of January, 2017

Michelle K. Lee
*Director of the United States Patent and Trademark Office*